United States Patent Office 3,288,008
Patented Nov. 29, 1966

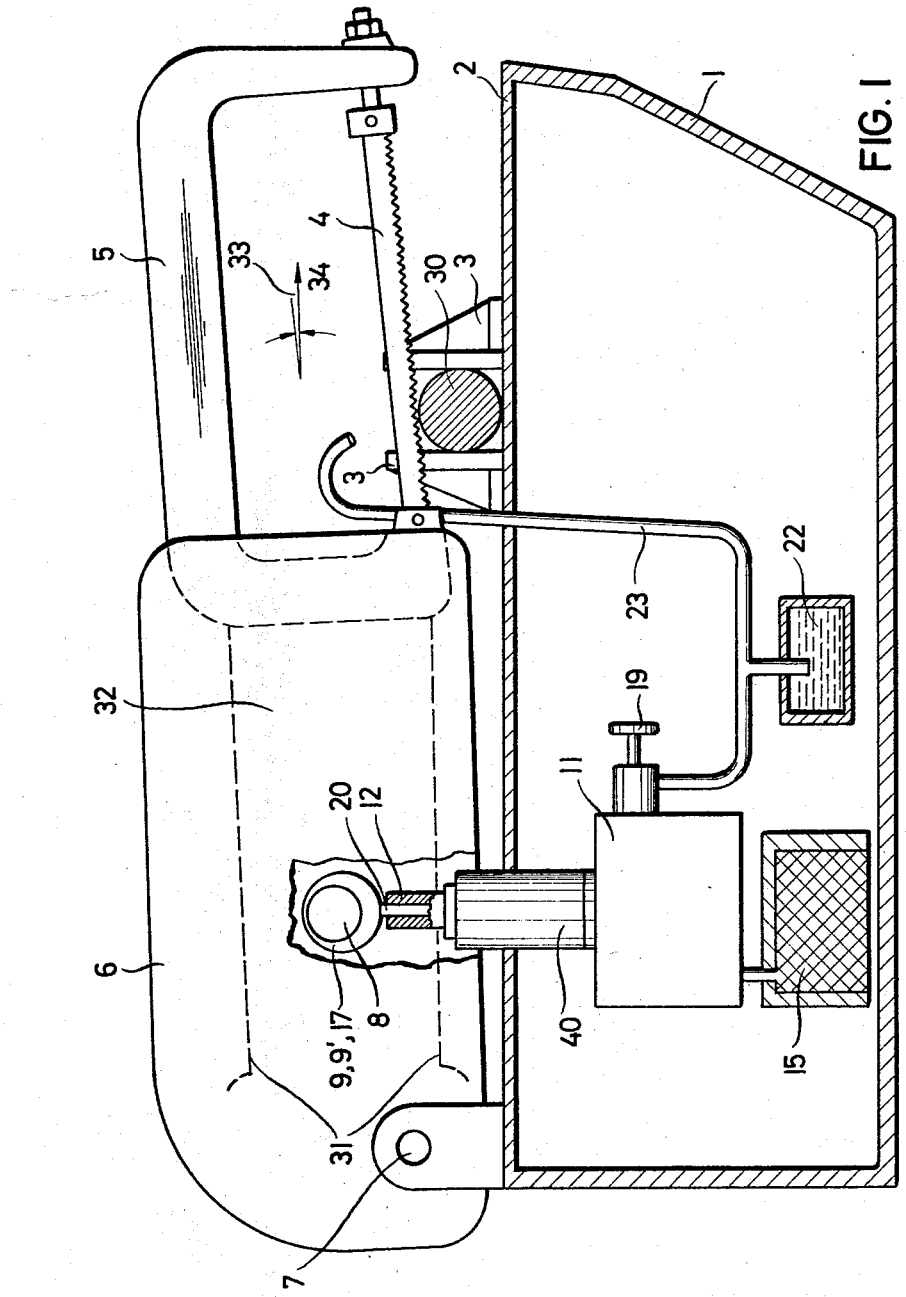

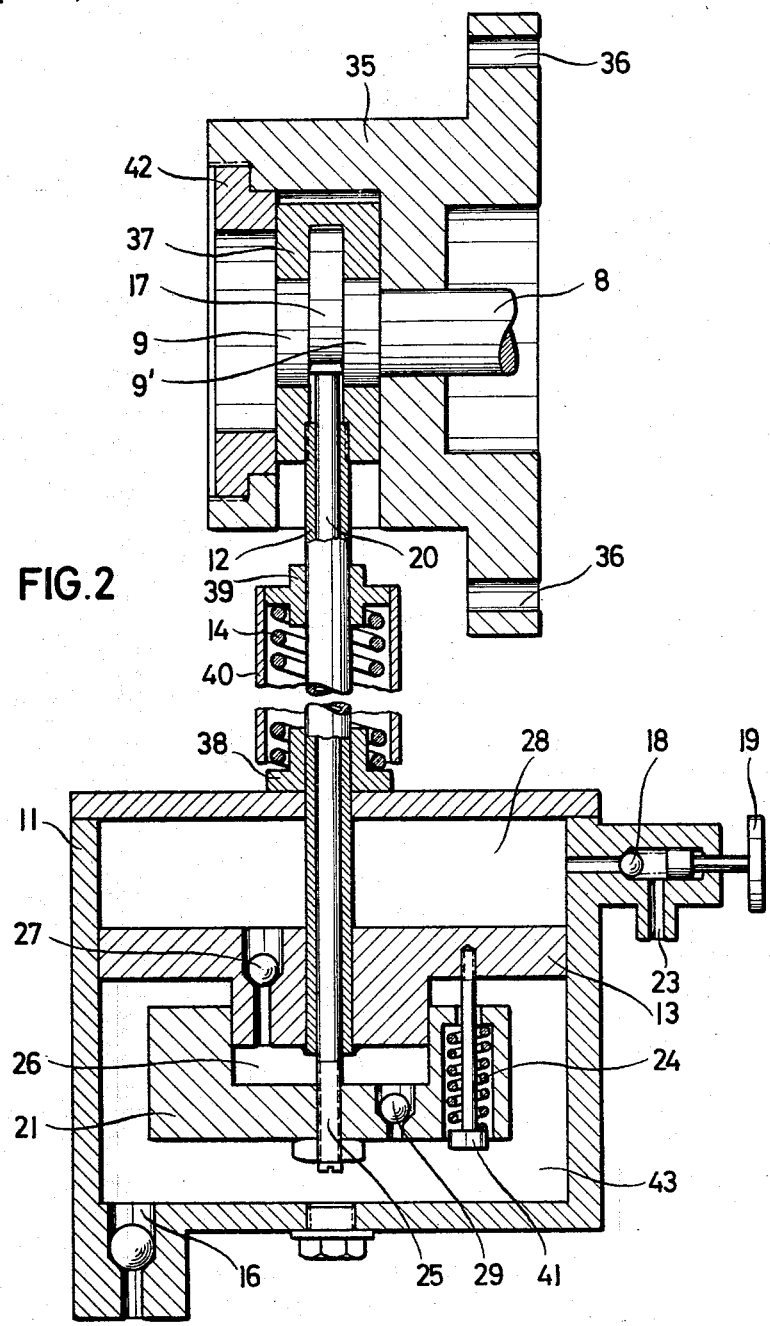

3,288,008
HACK SAW MACHINE
Paul Stolzer, Achern, Baden, Germany, assignor to Karl Stolzer, Achern, Baden, Germany, a German firm
Filed Sept. 30, 1965, Ser. No. 491,697
Claims priority, application Germany, Sept. 30, 1964, St 22,747
11 Claims. (Cl. 83—169)

The present invention relates to a hack saw machine of the type in which the saw blade is mounted in the saw bow so as to extend at an oblique angle to the means for guiding the saw bow during the cutting strokes, and which is equipped with a hydraulic control mechanism which operates automatically so as to lift the saw blade off the workpiece at the end of each cutting stroke, to return it upon the workpiece at the end of each return stroke, and to produce the most suitable cutting pressure of the saw blade during the cutting strokes. This hydraulic control mechanism comprises a double-acting piston which is movable upwardly and downwardly within a cylinder by means of its piston rod which supports the pivotable guide means of the saw bow and is acted upon by a cam plate which is connected to the guide means of the saw bow and is rotatable in accordance with the reciprocating movements of the saw bow. When this piston is moved in one direction within the cylinder, the pressure fluid which is thereby displaced from one of the cylinder chambers flows through a bypass to the other cylinder chamber, while by the movement of the piston in the opposite direction the fluid which is then displaced from the other cylinder chamber is pumped through an adjustable one-way throttle valve into a conduit which conveys it to the saw blade for cooling the same. During the return stroke of the saw bow, the piston rod is acted upon by a compression spring in the direction toward the guide means of the saw bow so as to compensate the weight of these guide means and of the other parts which are pivotable therewith.

The hack saw machines of the type as above described which were known prior to this invention and are disclosed, for example by my German Patent No. 1,068,086, are provided with a cylinder and a double-acting piston therein which divides this cylinder into two chambers and is movable back and forth therein by a cam plate. When this piston is moved in one direction, pressure fluid is sucked from a tank into the first of these chambers, while by the movement of the piston in the opposite direction, the sucked-in fluid is expelled from this chamber through a bypass and an adjustable throttle valve therein into the second cylinder chamber. During the following movement of the piston in the opposite direction, the pressure fluid is passed from the second cylinder through another adjustable throttle valve into a conduit which then conveys the fluid to the saw blade for cooling the same. The speed of the movements of the piston in both directions is retarded by the throttle valves at an extent which depends upon the particular adjustment of these valves. This retarding effect upon the movement of the piston in one direction is utilized for lifting the saw blade off the workpiece after it has completed its cutting stroke, and the retarding effect upon the movement of the piston in the other direction is utilized for lowering the saw blade upon the workpiece after it has completed its return stroke and for then also producing the necessary cutting pressure for the next cutting stroke.

This known hack saw machine has the disadvantage that, whenever the cutting speed is changed it also becomes necessary to readjust the retarding effect of the two throttle valves by a new adjustment of these valves and especially of the valve which controls the lifting movement of the saw blade. If such a new adjustment is omitted when the speed of the machine is increased, the extent of the lifting movement of the saw blade will become too large and at the end of its return stroke the blade will be lowered upon the workpiece so as to engage thereon with such an impact that the teeth of the blade may be damaged. If, on the other hand, the speed of the machine is reduced, the extent of the lifting movement will also be reduced since the velocity of flow of the pressure fluid through the throttle valve will then decrease and consequently the hydraulic pressure in the respective cylinder chamber which produces the lifting movements will likewise decrease. If the machine is driven at a very low speed, the lifting movement may no longer occur at all and during its return stroke the saw blade will then slide directly along the workpiece with the result that the teeth of the blade will be worn off prematurely.

Since the necessary adjustments of the throttle valves of this known machine require time as well as experience, it often occurs that they are omitted, especially also because the persons which operate such machines are usually relatively unskilled and not sufficiently qualified to carry out such adjustments.

It is an object of the present invention to provide a hack saw machine which completely eliminates the above-mentioned disadvantages of similar machines of the known type by providing it with suitable means for producing a hydraulic pressure which is adapted to overcome a spring force which normally tends to maintain the saw bow in an upwardly pivoted position in which the saw blade is lifted off the workpiece, and which pressure will pivot the saw bow at the proper time against this spring force to the particular position in which at the end of the return stroke the saw blade will engage upon the workpiece, and which will thereafter also exert upon the saw bow the necessary force for the desired cutting pressure of the saw blade upon the workpiece. Another object of the invention consists in providing these means in the form of an auxiliary mechanism, the operation of which is independent of the cutting speed of the machine.

For attaining these objects, the present invention provides an auxiliary piston which is adapted to pivot the saw bow including the housing which contains the guide and driving means for the saw bow from its oblique position in which the saw blade is lifted off the workpiece against the action of a compression spring to the position in which the saw blade is lifted off the workpiece against the action of a compression spring to the position in which the saw blade engages upon the workpiece. According to the invention, this auxiliary piston is operatively associated with the main piston by being adapted to feed that amount of pressure fluid into one of the cylinder chambers which is required for moving the main piston to the position in which the saw blade is engaged upon the workpiece at the end of its return stroke.

The reciprocating movements of the main piston and the auxiliary piston result in the displacement of very accurately determined quantities of fluid from the different cylinder chambers. The particular quantity of fluid which is then displaced by the auxiliary piston is independent of the speed at which the machine is driven and remains practically uniform regardless of this driving speed. Thus, there is no need to provide an adjustable throttle valve for controlling the distance of movement of the auxiliary piston for conveying the proper amount of fluid into the respective cylinder chamber so as to insure that the main piston will be moved to the precise position in which the saw blade engages upon the workpiece.

A very preferred embodiment of the invention consists in designing the main piston and the auxiliary piston so that the latter is guided by the main piston in the axial direction of the latter and that a fluid chamber is formed between both pistons which is tightly sealed relative to the main cylinder and the capacity of which is varied by the axial movements of the two pistons relative to each other. The bypass leading from one cylinder chamber to the other is formed by channels which extend through both pistons and contain check valves which insure that the fluid can flow from one cylinder chamber into the other only in the direction through the auxiliary piston into the intermediate chamber and from the latter through the main piston. Each of the two pistons may be driven by a separate eccentric in a particular timed relation to the reciprocating movements of the saw bow. The compression spring is made of such a strength that it will compensate the weight of the pivotable parts of the machine and tend to maintain these parts during the return stroke of the saw bow in a position in which the saw blade is lifted off the workpiece.

Another feature of the invention consists in making the piston rod of the main piston of a tubular shape and in extending the piston rod of the auxiliary piston through the inside of the tubular piston rod so as to be slidable in the axial direction relative thereto. The auxiliary piston is preferably connected to the main piston by means of stay bolts and by the action of at least one spring which tends to move the auxiliary piston in the axial direction toward the main piston.

For the purpose of accurately adjusting the quantity of fluid to be conveyed by the auxiliary piston into the upper cylinder chamber, the piston rod of the auxiliary piston is preferably rotatable within the tubular piston rod of the main piston and its lower end is provided with a screw thread on which the auxiliary piston is screwed so that when this lower end of the piston rod is turned in one direction or the other, for example, by a screw driver, the nonrotatable auxiliary piston will be shifted along the screw thread in the axial direction relative to the main piston, whereby the capacity of the intermediate chamber between the pistons will be changed accordingly.

The cylinder chamber which contains the auxiliary piston and also forms the suction chamber for the main piston is preferably connected in the usual manner with a fluid tank by means of a check valve.

Another feature of the invention consists in the provision of a pair of eccentric elements for driving the main piston and the auxiliary piston. These eccentric elements are mounted on a common shaft which is driven in accordance with the reciprocating movements of the saw bow and is rotatably mounted within the pivotable housing which contains the driving and guide means for the saw bow. One of these eccentric elements preferably consists of a pair of eccentric disks of equal eccentricity and equal angularity relative to the shaft which are operatively associated with the piston rod of the main piston, while the other eccentric element consists of an eccentric disk which is operatively associated with the piston rod of the auxiliary piston and mounted on the shaft between the pair of eccentrics. This pair of eccentrics may be enclosed by and rotatable within a common eccentric ring to which the end of the tubular piston rod of the main piston may be secured in a radial direction, for example, by being screwed into this ring.

Contrary to the hack saw machines of the known type as previously described, it is another important feature of the invention that the new machine is only equipped with a single adjustable throttle valve whereby one of the cylinder chambers which are separated by the main piston is connected in the conventional manner with a conduit through which the fluid is conducted to the saw blade for cooling the same.

The above-mentioned as well as numerous other features and advantages of the present invention will become further apparent from the following detailed description thereof which is to be read with reference to the accompanying diagrammatic drawings, in which FIGURE 1 shows, partly in section, a side view of a hack saw machine according to the invention, while FIGURE 2 shows a cross section of the hydraulic control mechanism of the machine according to FIGURE 1 and of the driving means for this mechanism.

As illustrated in FIGURE 1, the hack saw machine according to the invention comprises a hollow frame 1 which forms a tank and is covered by a top plate 2 on which a pair of vise jaws 3 is mounted in a conventional manner for clamping a workpiece 30 which is to be sawed. The saw blade 4 is clamped in the saw bow 5 which is mounted on a slide carriage 32, as merely indicated diagrammatically, which is adapted to be reciprocated along a guideway 31 by a suitable drive mechanism, not shown. This guideway 31 is provided within a housing 6 which together with the saw blade 4, the saw bow 5, and the slide carriage 32 is pivotable about an axis 7 on an upwardly projecting part of frame 1 so that during its forward stroke the saw blade 4 may saw the workpiece 30 and may be lifted off the latter during its return stroke.

The saw bow 5 is illustrated in FIGURE 1 in the position which it assumes at the end of its forward or cutting stroke. Saw blade 4 is mounted in the saw bow 5 so as to extend at an angle 33 to the direction of movement 34 of slide carriage 32 in guideway 31 and thus also of the saw bow 5 during the cutting strokes. Due to this inclination 33, saw blade 4 while moving in the direction 34 during each cutting stroke pivots together with saw bow 5, carriage 32, and housing 6 in the upward direction about the axis 7. At the end of each cutting stroke, when this group of elements is located substantially in the position as shown in FIGURE 1, these elements should be further pivoted in the upward direction in order to lift the saw blade 4 completely off the workpiece 30 and to insure that it will not engage with the workpiece during its return stroke. However, during the return stroke, housing 6 together with slide carriage 32, saw bow 5, and saw blade 4 should be pivoted downwardly, that is, in the clockwise direction as seen in FIGURE 1, to such an extent that at the end of the return stroke the front end of saw blade 4 will again engage substantially without pressure upon the workpiece 30. During the subsequent cutting stroke, a certain cutting pressure should be exerted upon the saw blade 4 which should be adjustable in accordance with the properties of the material of the workpiece 30 which is to be cut.

The hydraulic mechanism for controlling these operations of lifting the saw blade 4 off the workpiece at the end of each cutting stroke, of lowering it again during the return stroke and setting it upon the workpiece 30 at the end of the return stroke, and of thereafter producing the necessary cutting pressure is driven by a shaft 8 which, in turn, is driven by the main drive of the machine in a particular relation to the reciprocating strokes of the saw bow. As shown in FIGURE 2, shaft 8 is rotatably mounted in a housing 35 and carries on its end within this housing an eccentric 17 and a pair of eccentrics 9 and 9' of equal eccentricity at the opposite sides of the eccentric 17. Housing 35 is secured to housing 6 by bolts which are inserted through the bores 36 in the flange of housing 35. For the purpose of a clearer illustration, these three eccentrics 17, 9 and 9' are shown in the drawings with a greater degree of eccentricity than they would actually possess. These eccentrics 9, 9' and 17 which are driven by shaft 8 are operatively associated with piston rods or connecting rods 12 and 20 which are guided so as to carry out rectilinear movements. The connecting rod 20 which is associated with the central eccentric 17 extends through and is slidable in the axial direction within the tubular connecting rod 12 which is associated with the pair of eccentrics 9 and 9'. These two eccentrics 9 and 9' are surrounded by and rotatable within a common eccentric ring 37 to which the end of the tubular connecting rod 12 is secured, for example, by being screwed into it, and which is maintained in its proper axial position within housing 35 by a ring 42 which is screwed into this housing. While the tubular connecting rod 12 is thus positively driven by the eccentrics 9 and 9′, the upper head-shaped end of the other connecting rod 20 merely engages with and slides along the peripheral surface of the eccentric 17. This connecting rod 20 is therefore merely driven in the downward direction by the eccentric 17, while its movement in the upward direction is produced by other means which will be subsequently described in detail.

The two connecting rods 12 and 20 which are movable axially relative to each other extend fluid-tight through the cover of a cylinder 11 which is shown in FIGURE 2 but only indicated diagrammatically in FIGURE 1. This cylinder 11 communicates through a check valve 16 with a filter 15 which is immersed in the cooling fluid which is contained within the tanklike frame 1. This cooling fluid is pumped from cylinder 11 into a conduit 23 which is connected by a branch pipe to a pressure-equalizing reservoir 22 and conducts the cooling fluid to the saw blade 4. As shown in FIGURE 2, cylinder 11 is provided with a throttle valve 18 in the form of a ball which is acted upon by a spring, the tension of which may be adjusted by a control wheel 19.

The tubular connecting rod 12 is surrounded by a compensating spring 14, one end of which acts through a spring cap 38 upon the cover of cylinder 11, while its other end acts upon a spring cap 39 which is rigidly secured to the connecting rod 12 and carries a sleeve 40 for enclosing and protecting this spring 14.

The main piston 13 which is movable upwardly and downwardly in cylinder 11 and is secured to the lower end of the tubular connecting rod 12 divides the cylinder 11 into an upper chamber 28 and a lower chamber 43. The lower part 25 of connecting rod 20 may be provided with a screw thread upon which the nonrotatable auxiliary piston 21 is screwed which may be adjusted very accurately to different levels on the connecting rod 20 when this connecting rod is turned by a screw driver in one direction or the other. Piston 21 may be locked in the adjusted position on the lower part 25 of rod 20 by a lock nut. The auxiliary piston 21 has an outer diameter of a smaller size than the inner diameter of cylinder 11 and it is therefore spaced from the inner wall of cylinder 11. The upper surface of piston 21 is provided with a central recess into which the lower reduced part of the main piston 13 engages and which thereby forms an intermediate cylinder chamber 26. The outer wall of this projecting part of the main piston 13 and the inner wall of the auxiliary piston 21 which defines the cylinder chamber 26 are axially slidable along each other with a substantially fluid-tight fit.

The main piston 13 carries a plurality of stay bolts 41 (only one of which is shown in FIGURE 2) which are equally spaced from each other in a peripheral direction and the heads of which fit loosely into socket bores in the outer part of piston 21, while the shanks of these bolts 41 carry coil springs 24 which act at one end upon the heads of the bolts and at the other end upon the bottoms of the socket bores in piston 21 and tend to press the auxiliary piston 21 together with its connecting rod 20 in the upward direction so as to maintain the upper end of the latter in engagement with the eccentric 17.

Both pistons 13 and 21 are provided with bores which extend in the axial direction and contain ball check valves 27 and 29 which insure that the fluid can only flow from the lower cylinder chamber 43 in the direction from the lower side of the auxiliary piston 21 into the intermediate cylinder chamber 26 and from the latter into the upper cylinder chamber 28 above the main piston 13. The fluid which is contained in the intermediate chamber 26 may also flow into the upper chamber 28 when the auxiliary piston 21 is moved toward the main piston 13, whereby a higher pressure is produced in chamber 26 and the fluid which is contained therein will pass through valve 27 into chamber 28. This occurs when the rotating eccentric 17 is turned to a position which permits the connecting rod 20 under the action of springs 24 to move upwardly so that its upper end will remain in engagement with the eccentric 17.

If during the further rotation of the eccentric 17 and its action upon the connecting rod 20 the latter is shifted downwardly, it will take along the auxiliary piston 21 which will thereby be moved away from the main piston 13 against the action of springs 24. By this movement a vacuum is produced in chamber 26 which sucks a certain amount of fluid out of the lower cylinder chamber 43 from the lower side of the auxiliary piston 21 through the check valve 29 into the intermediate chamber 26. This amount of fluid is subsequently pumped by the auxiliary piston 21 into the upper chamber 28.

The manner of operation of the hydraulic mechanism as above described is as follows:

The pair of eccentrics 9 and 9′ are secured on shaft 8 in such an angular position that, when the saw bow 5 after completing its forward cutting stroke reverses its direction of movement and is in the position as shown in FIGURE 1, these eccentrics tend to move the connecting rod 12 and thus also the main piston 13 downwardly. Although this movement also tends to move the saw blade 4 further toward the workpiece 30, it occurs against the action of the compensating spring 14 with the result that the saw bow 5 together with the housing 6 and all of the elements therein will be lifted and pivoted upwardly about the axis 7 and the saw blade 4 will be lifted off the workpiece 30. The lifting force of spring 14 and the opposed force of the downwardly moving piston 13 are coordinated with each other so as to insure that the saw blade 4 when reversing its direction of movement will be sufficiently lifted off the workpiece 30 but that the extent of this lifting movement will be limited.

The eccentric 17 is angularly offset to such an extent relative to the eccentrics 9 and 9′ that the connecting rod 20 will not arrive in its lowest position until the return stroke of the saw bow and saw blade has been started. By this downward movement, the auxiliary piston 21 has been moved for the largest possible distance away from the main piston 13 which caused the fluid to be sucked into the chamber 26 in the manner as previously described. During the subsequent part of the return stroke of the saw bow 5, the further rotation of the eccentric 17 permits the connecting rod 20 and the auxiliary piston 21 thereon to move upwardly, while the upper end of connecting rod 20 remains in gliding engagement with the peripheral surface of the eccentric 17. This upward movement of connecting rod 20 and piston 21 for a distance in accordance with the shape and position of the rotating eccentric 17 is due to the action of the coil springs 24 which tend at all times to force the auxiliary piston 21 in the upward direction. During the upward movement of the auxiliary piston 21, the fluid in chamber 26 is forced from the latter through the check valve 27 into the upper chamber 28 above the main piston 13 in which a higher pressure is thus formed which exceeds the force of the compensating spring 14 and shifts the main piston 13 downwardly and thereby pivots the housings 6 and 35 in the clockwise direction about the axis 7.

The extent of this pivoting movement is determined by the amount of fluid which is expelled from the intermediate chamber 26 and it is of such a size that the front end of the saw blade 4 will engage upon the workpiece 30 during the moment in which the saw bow 5 changes its direction of movement after completing its return stroke. In order to insure that this engagement will occur properly under any operating conditions so that at the beginning of each cutting stroke the front end of the saw blade will always engage upon the workpiece 30 almost without pressure, it is necessary to provide suitable means for accurately adjusting the amount of fluid which is displaced during the return stroke from the intermediate chamber 26 into the upper cylinder chamber 28. The auxiliary piston 21 is for this purpose adjustable in the axial direction in the manner as previously described by means of the screw thread and the lock nut on the lower part 25 of connecting rod 20. Such an adjustment of the auxiliary piston 21, in turn, results in an accurate adjustment of the amount of fluid which may be displaced from chamber 26 into the upper cylinder chamber 28 and thereby in an accurate adjustment of the extent of the pivoting movement of the saw bow which is completed when the saw blade engages with the workpiece. The amount of fluid which is displaced from chamber 26 depends upon the following factors:

(a) upon the distance which the saw bow 5 and thus also the housing 6 was pivoted upwardly during the preceding cutting stroke as the result of the inclined direction at which the saw blade 4 is clamped in the saw bow;

(b) upon the distance which the saw blade 4 was lifted from the workpiece at the end of the preceding cutting stroke by the additional pivoting movement of housing 6 in the counterclockwise direction;

(c) upon the increase in the cutting depth during the preceding cutting stroke which depends particularly upon the cross-sectional area of the workpiece which has been cut, upon the cutting resistance, and upon the cutting pressure as adjusted;

(d) upon the manufacturing tolerances which are unavoidable in the production of the machine, for example, those which might affect the inclination at which the saw blade 4 is clamped in the saw bow 5;

(e) upon the amount of the elastic deformation of the saw bow 5 due to the force at which the saw blade is clamped therein; and (f) upon the leakage of fluid from the hydraulic system which varies from one machine to another because of the different manufacturing tolerances of each machine and which increases with the wear upon the machine.

Although the pressure which occurs during the return stroke in cylinder chamber 28 acts upon the ball of throttle valve 18 which permits the cutting pressure to be adjusted, this ball will not be moved off its seat against the action of the valve spring until the pressure in chamber 28 has reached a considerable strength, that is, when the saw bow 5 together with housing 6 is lifted in the counterclockwise direction during the working stroke because of the inclined position of the saw blade 4 in the saw bow 5 and when a traction is thereby exerted by the eccentrics 9 and 9' upon the connecting rod 12 and the main piston 13 is drawn upwardly. The pressure which is thereby built up in chamber 28 then overcomes the force of the spring which acts upon the ball of valve 18 so that the fluid can pass into the conduit 23 and flow from the end of the latter upon the saw blade 4 for the purpose of cooling and lubricating the blade and for removing the chips therefrom. The pressure which is built up in the pressure-equalizing reservoir 22 when the ball of valve 18 is lifted off its seat is sufficient to continue the flow of fluid to the saw blade also during the cutting stroke.

When the saw bow 5 reaches the end of its cutting stroke, the cycle of operations as above described is repeated.

The throttle valve 18 serves in a conventional manner for adjusting the cutting pressure of the saw blade which is dependent upon the pressure in the cylinder chamber 28. The cutting pressure may therefore be increased or reduced by an appropriate adjustment of the valve spring of valve 18 by means of the control wheel 19. Since the weight of the saw bow 5 and the housing 6 including the driving elements which are contained therein is compensated by the upwardly directed force of spring 14, the hydraulic mechanism according to the invention permits what was impossible with the hydraulic mechanisms as were previously employed in such machines, namely, to adjust the cutting pressure from a value of zero to any desired strength. This cutting pressure of zero is that pressure which prevails when the lifting force of the compensating spring 14 is equal to the opposed pressure in chamber 28 and the weight of saw bow 5 including the housing 6 and the parts contained therein or equal to the torques which are produced by these forces about the axis 7.

It has already been described above that during the return stroke of the saw bow 5 a certain amount of fluid is displaced from chamber 26 into the cylinder chamber 28 and the main piston 13 is thereby forced downwardly for a certain distance. The extent of this downward movement depends upon the size of the angle 33 at which the saw blade 4 is inclined in the saw bow 5 relative to the direction of movement 34 of the saw bow, upon the size of the lifting movement subsequent to the cutting stroke, upon the manufacturing tolerances of the machine, upon the elastic deformation of the saw bow 5 which is caused by tightening the saw blade therein, and upon the cutting depth of the saw blade at each working stroke. It is therefore very important that the auxiliary piston 21 is adjustable in the axial direction in order to permit the amount of fluid which is displaced from chamber 26 to be very accurately controlled.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. In a hack saw machine having a frame, means on said frame for clamping a workpiece, a saw bow, guide means for guiding said saw bow for reciprocating movements in one direction, driving means for reciprocating said saw bow so as to carry out successive cutting and return strokes, means for pivotably mounting said guide means together with said saw bow on said frame so as to be pivotable relative to said workpiece about an axis extending transverse to and spaced from said saw bow, means for removably securing a saw blade in said saw bow in a position so as to extend at an oblique angle to said direction of movement of said saw bow so that during said cutting strokes said saw blade is pivoted upwardly together with said saw bow and said guide means, and control means for lifting said saw bow and saw blade off said workpiece at the end of each cutting stroke, for lowering said saw bow so that said saw blade will engage upon said workpiece at the end of each return stroke, and for thereafter exerting a force upon said saw bow so as to attain the desired cutting pressure of said saw blade on said workpiece during each cutting stroke, said control means comprising a compensating spring acting upon said guide means for substantially compensating the weight of said guide means and the elements connected thereto and pivotable therewith, a cylinder, a double-acting main piston within said cylinder, said first chamber adapted to contain a fluid, an auxiliary piston in said first chamber dividing said cylinder into a first and a second chamber, each of said pistons having a compression surface facing the other, means on at least one of said pistons for guiding said auxiliary piston so as to be movable telescopically on and in the axial direction relative to said main piston and defining an intermediate chamber located between said pistons in said first chamber when said compression surfaces of said pistons are spaced from each other, said intermediate chamber being sealed relative to said first and second chambers and having a variable capacity in accordance with the movements of said pistons relative to each other, a first piston rod secured near one end to said main piston, and a second piston rod secured near one end to said auxiliary piston, cam means rotatably mounted on said guide means and operatively connected to said driving means so as to be rotatable in a particular relation to the reciprocating movements of said saw bow, said cam means having cam surfaces laterally adjacent to and angularly offset relative to each other and each being adapted to act upon the other end of one of said piston rods for moving said pistons in a certain relation relative to each other, at least one first channel extending through said auxiliary piston and at least one second channel extending through said main piston, first and second check valves connected to said first and second channels, respectively, permitting said fluid to flow only in the direction from said first chamber to said second chamber, a conduit connected to said second chamber and leading to said saw blade, an adjustable one-way throttle valve connected into said conduit, whereby when said main piston is moved within said cylinder in the direction toward said first chamber containing said auxiliary piston, a part of the fluid contained in said first chamber is displaced therefrom so as to pass through said channels, said check valves and said intermediate chamber into said second chamber, while when said main piston is moved in the opposite direction, at least a part of the fluid then contained within said second chamber is passed from said second chamber through said throttle valve and said conduit to said saw blade for cooling and lubricating the same, said cam means being disposed in relation to the reciprocating movement of said saw bow in such a position that, when said saw bow reverses its direction of movement after completing its cutting stroke, said cam means tend to move said piston rod of said main piston together with said main piston in the direction against the action of said compensating spring, whereby said guide means and said saw bow are pivoted upwardly and said saw blade is lifted for a limited distance off said workpiece, said cam surfaces being angularly offset relative to each other so that, after said saw blade has been lifted off said workpiece at the end of each cutting stroke, said auxiliary piston is moved away from said main piston, whereby a certain amount of fluid is drawn from said first chamber through said first channel and said first check valve into said intermediate chamber, said auxiliary piston then being moved by its associated cam surface and said second piston rod toward said main piston, whereby said amount of fluid is passed from said intermediate chamber through said second channel and said second check valve into said second chamber and said main piston is thereby shifted for a certain distance in the direction toward said first chamber and by means of said first piston rod takes along and pivots said guide means and all other elements pivotable therewith including said saw bow and saw blade against the action of said compensating spring for a certain distance and independently of the speed of said driving means in the downward direction to the position in which said saw blade at the end of said return engages upon said workpiece.

2. A hack saw machine as defined in claim 1, in which said first and second check valves are located within said first and second channels, respectively.

3. A hack saw machine as defined in claim 1, in which said first piston rod is tubular, and said second piston rod extends through and is axially slidable within said first piston rod.

4. A hack saw machine as defined in claim 1, in which said main piston has an outer surface slidable along the inner wall of said cylinder, and said auxiliary piston has an outer diameter smaller than said main piston.

5. A hack saw machine as defined in claim 1, in which said means for guiding said auxiliary piston comprises a projection on said main piston extending in the axial direction into said first chamber, said auxiliary piston having a recess corresponding to said projection, the lateral walls of said recess being slidable substantially fluid-tight over said projection.

6. A hack saw machine as defined in claim 1, further comprising stay bolts connecting said auxiliary piston to said main piston, and at least one compression spring tending to move said auxiliary piston in the axial direction towards said main piston.

7. A hack saw machine as defined in claim 1, in which the lower part of said second piston rod is threaded, said auxiliary piston being nonrotatable relative to said main piston and being screwed on said threaded lower part and adjustable in the axial direction relative to said main piston when at least said lower part of said second piston rod is turned about its axis for varying the maximum fluid capacity of said intermediate chamber.

8. A hack saw machine as defined in claim 1, further comprising a tank containing a supply of said fluid, a conduit connecting said tank to said first chamber, a filter within said conduit, and a check valve in said conduit intermediate said filter and said first chamber, whereby some of said fluid will flow from said tank through said filter and said check valve into said first chamber when a suction is produced in said first chamber by the movement of one of said pistons in the direction toward said second chamber.

9. A hack saw machine as defined in claim 1, further comprising a housing connected to and pivotable with said guide means, a shaft rotatably mounted in said housing and adapted to be driven by said driving means in a fixed relation to the reciprocating movements of said saw bow, said cam means comprising a pair of eccentrics secured to said shaft and having the same eccentricity and angularity relative to said shaft, and another eccentric secured to said shaft intermediate said pair and angularly offset relative to said pair.

10. A hack saw machine as defined in claim 9, further comprising an eccentric ring within said housing, said pair of eccentrics being surrounded by and rotatable within said ring, said first piston rod being tubular and being secured at one end in a radial direction to said ring, said second piston rod extending through and being axially slidable within said first piston rod and having one end adapted to slide along said other eccentric during the rotation thereof, and resilient means tending to maintain said end of said second piston rod in engagement with said other eccentric.

11. A hack saw machine as defined in claim 1, having only said one throttle valve, said throttle valve being adapted to be normally closed and to be opened when, due to the inclined position of said saw blade in said saw bow, said saw bow together with said guide means is pivoted upwardly during each cutting stroke, whereby a traction is exerted upon said first piston rod and said main piston is drawn further into said second chamber and thereby produces a pressure within said second chamber sufficient to open said throttle valve to permit said fluid to flow through said conduit to said saw blade, and means on said throttle valve for varying its resistance against opening under the pressure contained within said second chamber for varying said cutting pressure of said saw blade during its cutting strokes.

References Cited by the Examiner
UNITED STATES PATENTS 2,089,899   8/1937   Kelly _____ 83—169

FOREIGN PATENTS 1,325,815   3/1963   France.

ANDREW R. JUHASZ, *Primary Examiner.*